United States Patent [19]

Pettus

[11] Patent Number: 5,289,512
[45] Date of Patent: Feb. 22, 1994

[54] NUCLEAR PROPULSION REACTOR

[75] Inventor: William G. Pettus, Monroe, Va.

[73] Assignee: The Babcock & Wilcox Company, New Orleans, La.

[21] Appl. No.: 895,054

[22] Filed: Jun. 8, 1992

[51] Int. Cl.$^5$ ............................................. G21D 5/06
[52] U.S. Cl. ..................................... 376/318; 376/223; 376/375; 376/381; 376/382; 376/387; 376/397; 376/430; 376/909
[58] Field of Search ............... 376/318, 375, 397, 387, 376/381, 382, 430, 909, 223

[56] References Cited

U.S. PATENT DOCUMENTS

| | | | |
|---|---|---|---|
| 3,034,977 | 5/1962 | Holl et al. | 204/193.2 |
| 3,132,999 | 5/1964 | Linsenmeyer | 176/54 |
| 3,150,052 | 9/1964 | Stoker et al. | 176/54 |
| 3,257,285 | 6/1966 | Clifford et al. | 176/33 |
| 3,286,468 | 11/1966 | Plebuch | 60/203 |
| 3,307,357 | 3/1967 | Colgate | 60/203 |
| 3,364,121 | 1/1968 | Schluderberg | 176/59 |
| 3,383,858 | 5/1968 | Willinski et al. | 60/203 |
| 3,447,321 | 6/1969 | Romero | 60/203 |
| 3,453,178 | 7/1969 | Winkler et al. | 376/375 |
| 3,778,344 | 12/1973 | Walsh | 176/22 |
| 3,793,832 | 2/1974 | Moon | 60/203 |
| 3,802,992 | 4/1974 | Griffith et al. | 176/20 |
| 3,817,029 | 6/1974 | Frisch | 60/203 |
| 3,820,325 | 6/1974 | Roman | 60/203 |
| 5,087,412 | 2/1992 | Bingham et al. | 376/368 |

*Primary Examiner*—Donald P. Walsh
*Assistant Examiner*—Chrisman D. Carroll
*Attorney, Agent, or Firm*—Robert J. Edwards; D. Neil LaHaye

[57] ABSTRACT

A nuclear propulsion reactor. A reactor vessel is provided with an annular first core and a cylindrical second core that is radially encompassed by the first core. Nuclear fuel elements in the first core provide first stage heating of propellant as they direct the propellant axially through the first core. The second core, which contains fissionable material in a highly refractory form, is in fluid communication with the first core for receiving the heated propellant. Fission reactions in the second core driven by leakage neutrons from the first core provide second stage heating of the propellant as it passes therethrough. The second core directs the coolant to a propellant nozzle for providing propulsive thrust.

7 Claims, 2 Drawing Sheets

NUCLEAR PROPULSION REACTOR

BACKGROUND OF THE INVENTION

1. Field of the Invention

The present invention is generally related to nuclear reactors and particularly to nuclear propulsion reactors.

2. General Background

Desirable features of nuclear propulsion reactors for vehicles to be used in outer space are a high thrust-to-weight ratio and high exhaust temperature. Unfortunately, these are conflicting requirements where nuclear reactors are concerned. A high thrust-to-weight ratio tends to require low density materials while a high exhaust temperature tends to require high density materials. When these two features are sought in a single reactor core, the result is invariably a compromise in the core design that leads to a lower thrust-to-weight ratio and/or exhaust temperature than might otherwise be possible. In previous space nuclear propulsion reactor concepts the propellant gas is heated from its cryogenic inlet temperature to its final exhaust temperature by a single core region. This is the case for the ROVER/NERVA type engines that have been built and tested and known conceptual designs. This leaves a need for a nuclear propulsion reactor that provides a thrust-to-weight ratio and exhaust temperature that is more favorable than that of current designs.

SUMMARY OF THE INVENTION

The present invention addresses the above need in a straightforward manner. What is provided is a nuclear propulsion reactor that utilizes two stages for heating the propellant. Fuel elements in an annular first stage heat the propellant as it passes therethrough. The propellant exits the first stage into a plenum which then directs the propellant into a second stage. The second stage also contains fissionable material and is positioned in the axial region so that it is radially encompassed by the first stage. Fission reactions in the second stage are driven by leakage neutrons from the first stage. The second stage is formed from refractory (heat resistant) materials that are capable of withstanding higher exhaust temperatures.

BRIEF DESCRIPTION OF THE DRAWINGS

For a further understanding of the nature and objects of the present invention reference should be had to the following description, taken in conjunction with the accompanying drawings in which like parts are given like reference numerals, and wherein.

DETAILED DESCRIPTION OF THE PREFERRED EMBODIMENT

Figure 1:
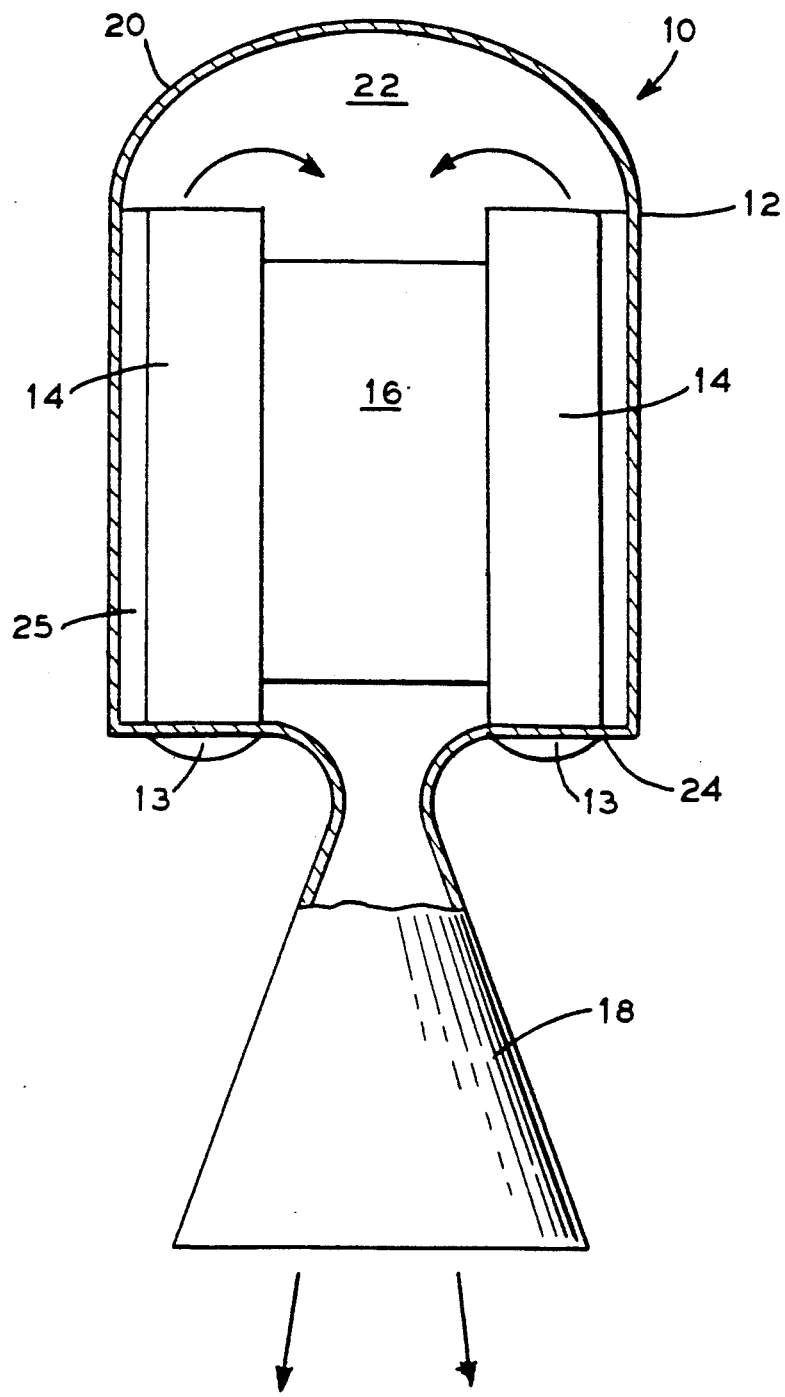
FIG. 1 is a schematic view of the invention.

Referring to the drawings, it is seen in the schematic illustration of FIG. 1 that the invention is generally indicated by the numeral 10. Nuclear propulsion reactor 10 is generally comprised of reactor vessel 12, annular-shaped first core 14, cylindrical second core 16, and propellant nozzle 18.

Reactor vessel 12 is formed as any suitable reactor pressure vessel known in the industry. First end 20 of reactor vessel 12 forms a plenum 22 that allows second core 16 to be in fluid communication with one end of first core 14. The second end 24 of reactor vessel 12 has propellant nozzle 18 attached thereto and in fluid communication with second core 16. A plenum 13 for the inlet propellant is also provided at the second end 24. As seen in the sectional view of FIG. 2, reactor vessel 12 may be provided with a neutron reflector 25 and control drums 26 between the reactor vessel wall and first core 14. Control drums 26 are arranged so as to be rotatable on their longitudinal axis. Each control drum 26 is provided with neutron absorber material 28 around a portion of its circumference for control of reactivity. Although only two control drums 26 are shown for ease of illustration it should be understood that a number of control drums would normally be spaced around the circumference of reactor vessel 12 when such control devices are incorporated into the reactor design.

Figure 2:
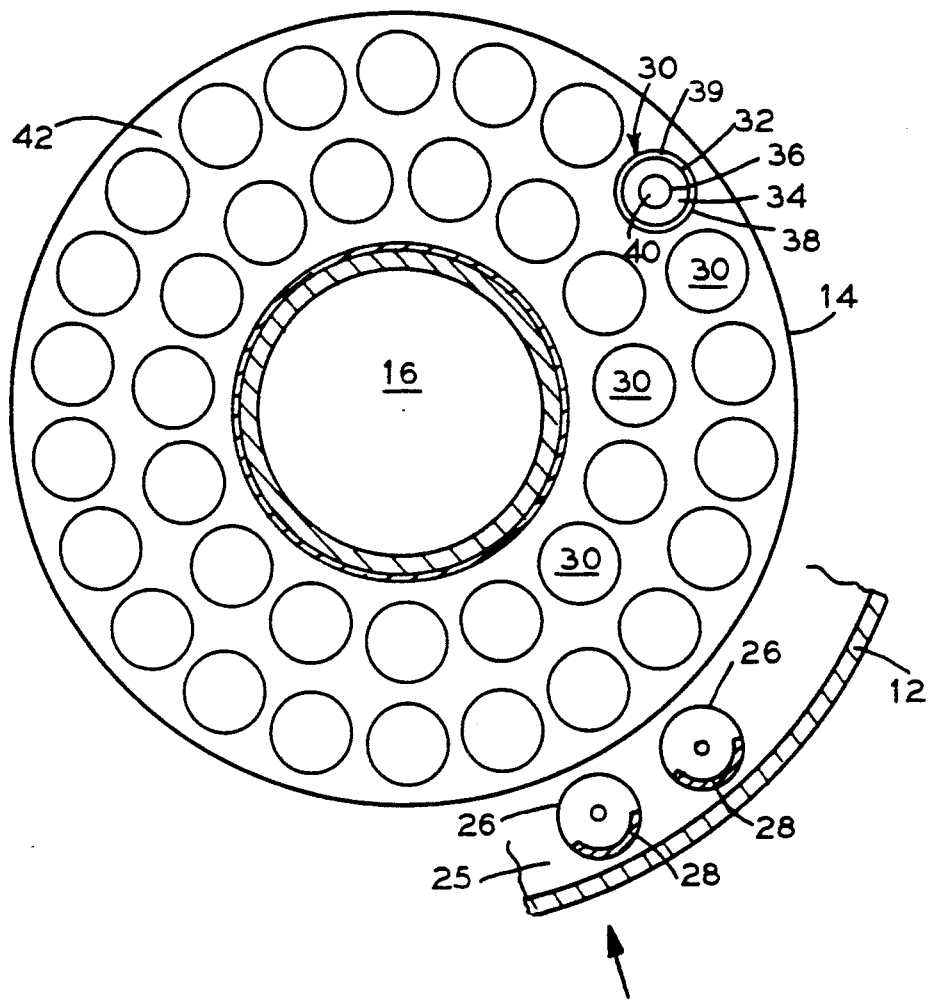
FIG. 2 is a sectional view across the longitudinal axis of the invention.

As seen in FIG. 2, first core 14 is annular in shape and provided with a plurality of fuel elements 30. In the preferred embodiment the propellant is heated directly by fuel elements 30 as the propellant travels through first core 14. For illustration purposes a particle bed reactor (PBR) fuel element design is shown. Each fuel element 30 is formed from an outer porous frit 32, inner porous frit 34, and fuel bed 36. Inner and outer frits 32, 34 are coaxial and held in position by end fittings in a manner known in the art. Fuel bed 36 in the annular space between frits 32, 34 is formed from a large number of relatively small spherical nuclear fuel particles. Each fuel element 30 is positioned inside a cylinder 38 such that there is a space between outer porous frit 32 and the inner surface of cylinder 38. During normal operations propellant/coolant flows into the inlet end of inlet channel 39 between outer porous frit 32 and cylinder 38, radially through outer frit 32, fuel bed 36, and inner frit 34 into the cylindrical space or exit channel 40 on the interior of inner frit 34, and then axially out the exhaust end of fuel element 30 through exit channel 40. The propellant/coolant is heated as it flows across fuel bed 36 and through exit channel 40. The details of only one fuel element 30 are shown for ease of illustration. Moderator material 42 is used in first core 14 between fuel elements 30 to enhance the fission reaction. A moderator such as beryllium hydride that has low specific mass, low neutron absorption, and high hydrogen concentration is preferred.

Figure 3:
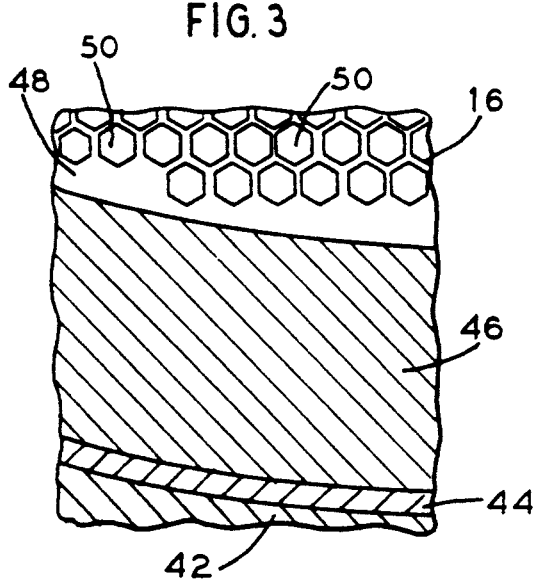
FIG. 3 is a detailed view of the second stage area.

FIG. 3 is an enlarged view of a portion of second core 16 seen in FIG. 2. Inner vessel wall 44 and insulation 46 separate first core 14 from second core 16. In the preferred embodiment second core 16 is formed from a cylindrical block 48 of a highly refractory fissionable carbide that is positioned in the axial space encompassed by first core 14. A plurality of axial passages 50 are provided through block 48 to allow the passage of propellant/coolant therethrough. The major metal component of block 48 is selected to optimize the refractory characteristics of the material. Examples of suitable metals are hafnium, tantalum, zirconium, and niobium. The fissionable component may be an isotope of uranium such as $U^{233}$ or $U^{235}$ or the such more reactive americium ($Am^{242m}$). As an alternate to the use of passages 50, block 48 may be in the form of an open porosity carbide foam that would allow flow of propellant/coolant therethrough.

Figure 4:
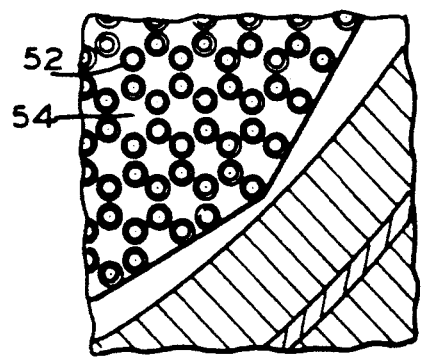
FIG. 4 is a detailed view that illustrates an alternate embodiment of the second stage of the invention.

FIG. 4 is also an enlarged view of a portion of second core 16 seen in FIG. 2 and illustrates an alternate embodiment of second core 16. In this embodiment, a plurality of conduits 52 are provided for flow of propellant/coolant therethrough. Heating of the propellant/coolant as it passes through conduits 52 may be accomplished by fissionable material incorporated into conduits 52 or by a fissionable gas contained in spaces 54 between conduits 52.

Propellant nozzle 18 may be any suitable type known in the art. Propellant nozzle 18 is attached to or in fluid communication with the second end 24 of reactor vessel 12. Propellant/coolant travelling through second core 16 is directed to propellant nozzle 18.

In operation, propellant/coolant from a source not shown is directed to flow through nuclear fuel elements 30 in first core 14. As it travels through first core 14 the propellant/coolant is heated to a temperature near 2500 degrees K. As indicated by the arrows in FIG. 1, the propellant/coolant enters plunum 22 and is directed into second core 16 where it is heated to a higher temperature as it travels through second core 16 to propellant nozzle 18. Propellant nozzle 18 is designed to produce propulsive thrust as the heated and expanding propellant/coolant exits propellant nozzle 18. Control drums 26 provide a means of controlling reactivity. Control rods may also be used in first core 14. The fission reaction in first core 14 causes heating of the propellant/coolant as it passes therethrough. The annular shape of first core 14 provides a source of predominantly high energy leakage neutrons for driving the fission reaction in second core 16. In this manner first core 14 serves as the first stage for heating the propellant/coolant to near the present maximum possible exhaust temperature. The highly refractory material of second core 16 serves as a second stage for heating the propellant/coolant to an even higher temperature that increases the specific impulse and the thrust-to-weight ratio. It should be noted that the invention described above is intended to address the propulsive needs of vehicles designed for military space missions and for deep space exploration. For ease of illustration, details of such vehicles and means for supplying propellant/coolant known in the art are not shown. For maximum efficiency, liquified gas is normally used as a propellant since it quickly changes to its normal gaseous state during passage to the reactor and expands during heating by the reactor. This also serves the purpose of removing heat from the reactor and maintaining component temperatures within acceptable limits.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A Nuclear Propulsion reactor, comprising:
   a. a rector vessel enclosing two separate coaxial core regions;
   b. an annular-shaped first core positioned inside said reactor vessel, said first core containing particle bed reactor nuclear fuel elements having inlet and exhaust ends that direct propellant axially therethrough;
   c. beryllium hydride moderator material positioned between the fuel elements in said first core;
   d. a cylindrical second core containing fissionable material positioned in the axial space encompassed by said first core and in fluid communication with the exhaust end of said first core for heating propellant to a higher temperature than said first core;
   e. thermal insulation between said first and second cores; and
   f. a propellant nozzle attached to one end of said reactor vessel and in fluid communication with said second core.

2. The reactor of claim 1, further comprising control drums positioned inside said reactor vessel.

3. The reactor of claim 1, wherein said second core is formed from a highly refractory fissionable carbide.

4. The reactor of claim 1, wherein said second core is formed from an open porosity carbide foam.

5. The reactor of claim 1, wherein said second core is formed from a plurality of conduits positioned axially in said core.

6. The reactor of claim 5, wherein fissionable material is incorporated into said conduits.

7. The reactor of claim 5, wherein a fissionable gas is contained in spaces between said conduits.

* * * * *